Feb. 10, 1931.  J. F. WIPPEL  1,791,608
WIRE CUTTER
Filed Jan. 29, 1930  2 Sheets-Sheet 1
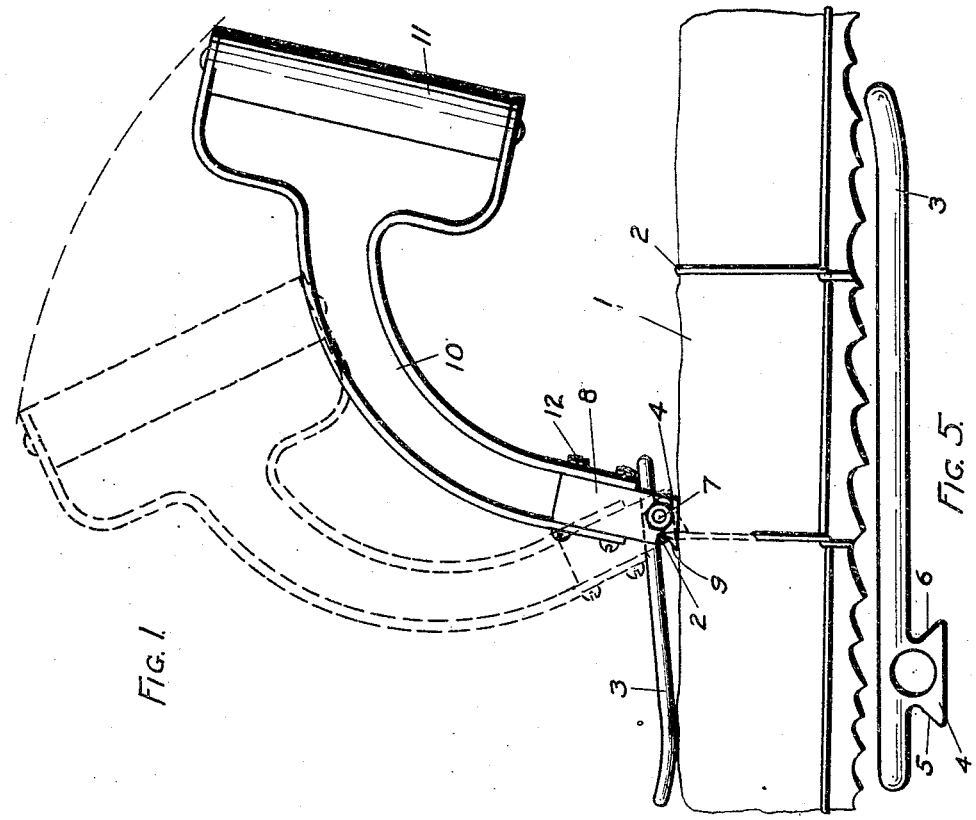
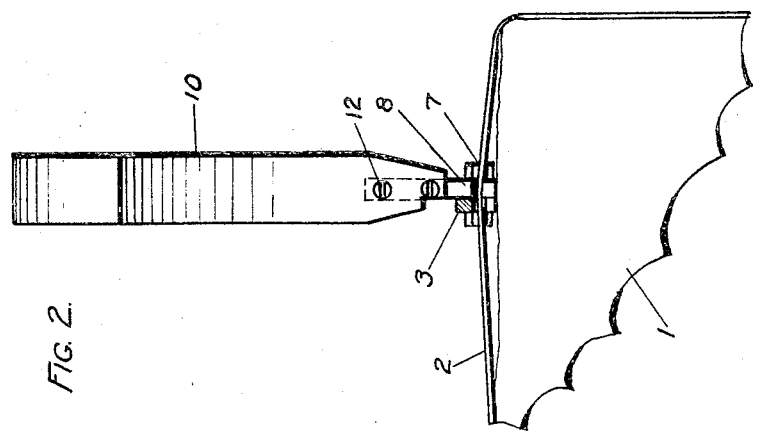
Inventor
JULIUS F. WIPPEL
By Owen H. Spencer
Attorney Feb. 10, 1931.    J. F. WIPPEL    1,791,608
WIRE CUTTER
Filed Jan. 29, 1930    2 Sheets-Sheet 2
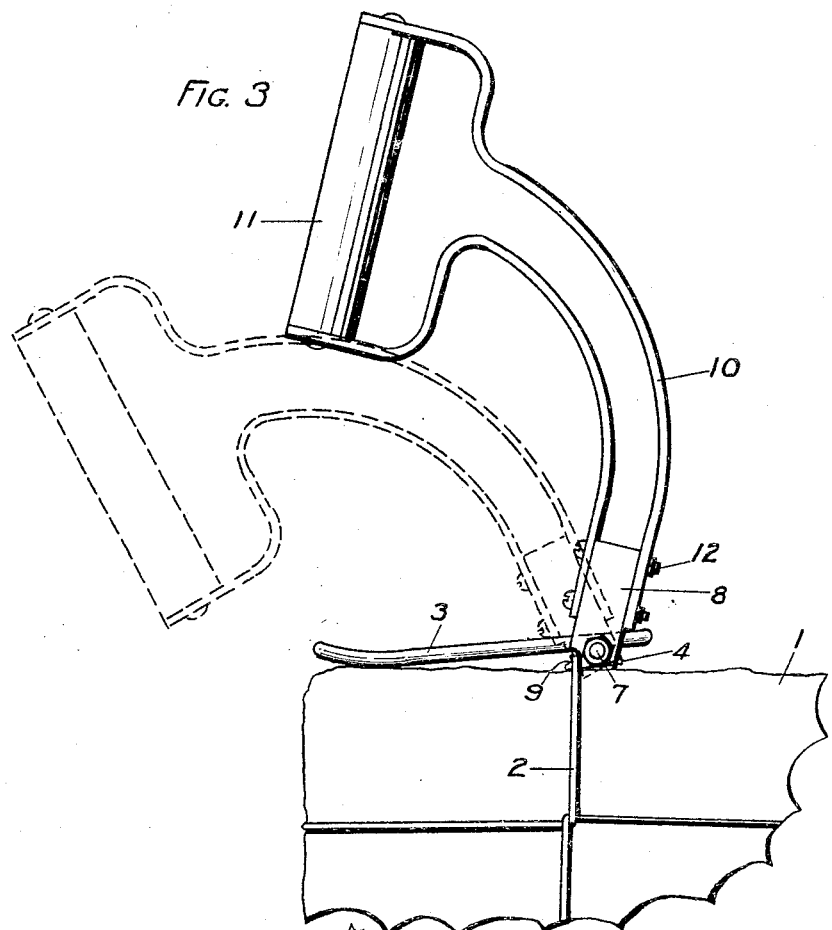
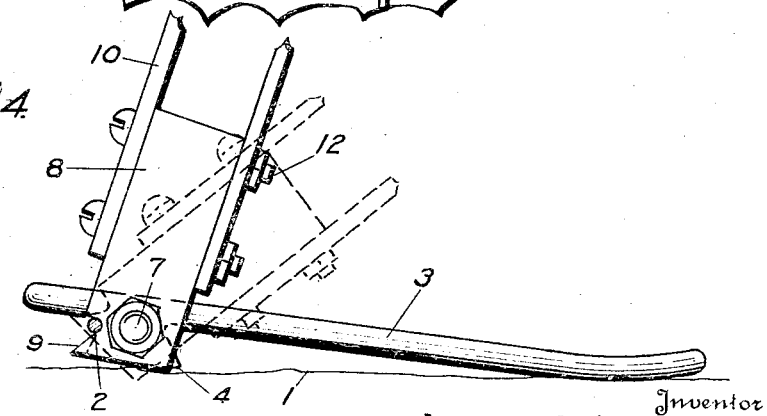
Inventor
JULIUS F. WIPPEL Patented Feb. 10, 1931

1,791,608

UNITED STATES PATENT OFFICE

JULIUS F. WIPPEL, OF INDIANAPOLIS, INDIANA

WIRE CUTTER

Application filed January 29, 1930. Serial No. 424,166.

This invention relates to wire cutters and of that class designed primarily for cutting the wires used for tying papers or the like into bales, although it may be utilized for general purposes.

One feature of the invention is the provision of a tool that may be quickly and easily placed in position to sever a wire that is more or less tightly drawn around a bundle or bale.

A further feature of the invention is in so constructing the wire cutting device that it may be placed in position and operated with one hand.

A further feature of the invention is the provision of a pivoted cutting element that may be swung in either direction for cooperation with the stationary cutting element.

A further feature of the invention is the provision of a reversible handle for the pivoted cutting element.

A further feature of the invention is the provision of a reversible stationary cutting element.

Other objects and advantages will be hereinafter more fully set forth and pointed out in the accompanying specification.

In the accompanying drawings which are made a part of this application,

Figure 1 is a side elevation of the cutting device applied to use for severing the wires surrounding a bale, the cutting position of the movable cutting element being shown in dotted lines.

Figure 2 is a front elevation thereof with parts in section.

Figure 3 is a side elevational view with the position of the handle reversed from that shown in Fig. 1.

Figure 4 is a detail elevation of the tool with the pivoted cutting element reversed from the positions shown in Figs. 1 and 3.

Figure 5 is a side elevation of the stationary cutting element.

Referring to the drawings in which similar reference numerals designate corresponding parts throughout the several views, the numeral 1 designates a bale of papers or other suitable commodity and 2 indicates wires, which surround the bale and hold the same in assembled relation.

In shipping newspapers, magazines and the like, it is customary, where a number of the articles are shipped to one point, to form them into a bale or bundle and bind them together. It has also been the custom to use cord for binding purposes, but owing to the expense of the cord and the instability thereof, it has been found preferable to use wire for binding purposes, due to the stability and cheapness thereof.

When wire is used it is more difficult to sever the wire than it would be the cord and to this end I have provided a convenient tool for cutting the wire 2, comprising a bar 3, having a substantially triangular shaped projection 4 near one end thereof, the inclined faces 5 and 6 thereof forming cutting elements.

Pivoted to the bar 3, in line with the projection 4, by means of a pivot bolt 7, is a plate or jaw 8, said plate having a substantially hook-shaped recess 9 in the base portion thereof forming a cutting element for cooperation with the cutting edges of the projection 4, so that a wire entered over one of the inclined faces 5 or 6 and in said recess 9, will be servered in imparting swinging action to the plate 8.

Associated with the plate 8 is a curved handle member 10, having a hand grip 11 at its outer extremity, the handle member being attached to the plate 8 by means of bolts 12, so that the handle member may be reversed with respect to the plate, if desired. By curving the handle member as shown, it may be more readily operated for entering the projection beneath the wire and then operating the handle for cutting the wire.

In applying the tool to use, the hand grip 11 is grasped and the tool positioned so that the projection 4 will rest on the face of the bale 1 with the end of the bar 3 farthest from the projection 4 resting on the face of the bale, then the entire tool is moved with a sliding movement over the face of the bundle until one inclined face of the projection 4 passes beneath a section of the wire 2, when by swinging the handle member 10 on its pivot, the cutting element formed by the recess 9 will sever the wire at the point where the wire passes over the inclined face of the projection 4. The inclined faces 5 and 6 serve to elevate the wire and cause the same to enter the recess 9 as well as acting as a cutting element when the wire is forced thereagainst by the cutting element of the recess 9.

In some instances it is preferable to have the handle member 10 positioned as shown in Fig. 1, while at other instances it is preferable to have the same project as shown in Fig. 3, and likewise, it is sometimes preferable to have the plate 8 positioned with respect to the bar 3 as shown in Figs. 1 and 2, while at other times, it is preferable to have the plate 8 positioned as shown in Fig. 4, depending somewhat upon the shape and dimensions of the bale and the position of the wires thereon.

The direction in which the tool is moved when being engaged with the wire depends principally upon the position of the recess 9 with respect to one of the inclined faces on the projection 4.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

What I claim is:

1. In a device for cutting binding wires, a bar having a substantially triangular-shaped projection adjacent one end, a plate pivoted to said bar, means on the plate for severing a wire when rocked on its pivot, and a reversible handle member attached to said plate.

2. In a device for cutting wire, a bar, a projection on said bar having inclined faces, a reversible plate pivoted to said bar, means at one edge of said plate for severing a wire when the plate is pivoted, and a handle member reversibly attached to said plate.

3. In a device for cutting wire, an elongated bar, a projection on the bar adjacent one end thereof, said projection having tapered side faces, and a plate pivoted to said bar having a recess forming a cutting element and adapted to sever a wire resting on one face of the projection and through said recess when the plate is rocked on its pivot.

In testimony whereof, I have hereunto set my hand on this the 15th day of January, 1930.

JULIUS F. WIPPEL.